Feb. 17, 1970 J. C. MANLEY 3,496,435
ENCAPSULATED ELECTRICAL CAPACITOR
Filed Dec. 9, 1968
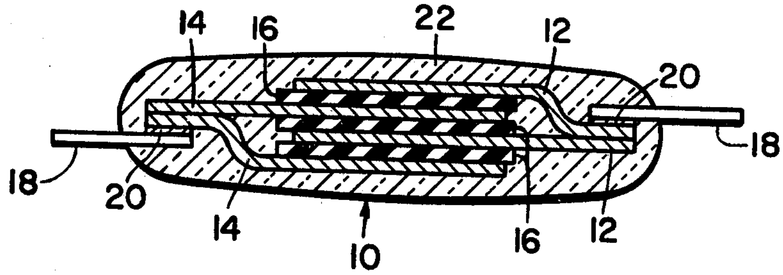
INVENTOR.
John C. Manley
BY
Walter S. Zebrowski
ATTORNEY United States Patent Office 3,496,435

Patented Feb. 17, 1970

3,496,435

ENCAPSULATED ELECTRICAL CAPACITOR

John C. Manley, New Haven, Conn., assignor to Corning Glass Works, Corning, N.Y., a corporation of New York Continuation-in-part of application Ser. No. 581,803, Sept. 26, 1966. This application Dec. 9, 1968, Ser. No. 782,122

Int. Cl. H01q *1/00;* H01c *1/02*

U.S. Cl. 317—258 4 Claims

ABSTRACT OF THE DISCLOSURE

An electrical capacitor having leads disposed adjacent the ends of the capacitor element along the longitudinal axis thereof. Conductive material is applied to the junction of the element and the leads, and a continuous, adherent impervious coating of glass is applied over the element and a portion of the leads so that the leads are maintained adjacent the ends and in electrical contact with the element through the conductive material by the coating of glass.

BACKGROUND OF THE INVENTION

This application is a continuation-in-part of application Ser. No. 581,803 filed Sept. 26, 1966, now abandoned, which in turn is a division of application Ser. No. 313,513 filed Oct. 3, 1963, now Patent 3,305,821 issued Feb. 21, 1967.

Impedance devices, such as resistors, capacitors, or inductors are usually encapsulated to provide the element with a thermal barrier, or to protect the element from attack by excessive moisture or damage by corrosion, or to perform the function of electrically insulating the element from adjacent elements, or in certain applications, all these functions may be served.

The prior art methods of forming and encapsulating electrical impedance elements fall into three general categories, the first of which is a potting method whereby the element is coated with a fluid or semi-fluid dielectric potting material, and is subsequently allowed to harden about the body of the element to provide the necessary protective coating. Another method is one where the element is hermetically sealed in a container that may be either evacuated or filled with an inert atmosphere. The third method is one where a glass or like material sleeve is disposed about the element and thereafter shrunk by various means to form an adherent coating thereon.

Any of these methods have serious drawbacks particularly where small, precision impedance elements are required, in that they are expensive; require caps to make electrical connection between the leads and element, which caps cause bulges and irregular shapes, trap air beneath the coating, and provide a weak connection between the lead and the element; are subject to impedance variations as a result of high temperature fabrication and encapsulation; and have other disadvantages.

A further disadvantage of prior art encapsulation methods arises from the necessity of welding or otherwise securing the leads to the impedance element prior to the encapsulation thereof. This separate step of securing the leads to the element is both costly and time consuming.

SUMMARY OF THE INVENTION

It is an object of this invention to provide a capacitor element having leads secured thereto solely by a coating of glass.

Another object of this invention is to provide a low cost hermetically sealed capacitor.

Another object of the present invention is to provide a hermetically sealed capacitor noted by its high order of accuracy, reproductibility, and relatively high selection rate.

Another object is to provide a hermetically sealed capacitor that is noted by its ease of manufacture.

A further object is to provide a hermetically sealed capacitor that is noted by the bond strength between the leads and the capacitor element.

Briefly, this invention relates to a capacitor which comprises a capacitor element having a pair of leads disposed adjacent the ends of the element along the longitudinal axis thereof. Conductive material is disposed at each junction of the capacitor element and the leads, the conductive material providing substantially no mechanical bond between the elements and the leads. A continuous adherent impervious coating of glass is applied over the entire element and portion of the leads, and the leads are maintained adjacent the ends and in electrical contact with the element through the conductive material solely by the coating of glass.

Additional objects, features, and advantages of the present invention will become apparent, to those skilled in the art, from the following detailed description and the attached drawing on which by way of example, only the preferred embodiments of this invention are illustrated.

BRIEF DESCRIPTION OF THE DRAWING

The sole figure is a cross-sectional elevation of a capacitor formed in accordance with this invention.

DETAILED DESCRIPTION

Referring to the figure, there is shown a stacked capacitor 10, the capacitor element of which consists of plates 12 and 14 separated by layers of dielectric material 16. The plates 12 are electrically connected together at one end of the capacitor element, and the plates 14 are electrically connected together at the opposite end. Thin films of conductive material 20 are disposed between leads 18 and the adjacent end portions of the plates 12 and 14. The assembly thus formed is thereafter encapsulated by a coating 22 which will be hereinafter described.

The leads 18 are maintained adjacent the ends of the capacitor element along the longitudinal axis thereof solely by the coating 22 since the thinness of the film 20 is such that substantially no mechanical strength is provided thereby. Webster's Seventh New Collegiate Dictionary defines the word "along" as "in a line parallel with the length or direction of," therefore, according to the present teaching, leads 18 are maintained adjacent the ends of the capacitor element in a line parallel with the direction of the longitudinal axis thereof solely by coating 22. The sole purpose of the film 20 is to provide electrical continuity between the capacitor plates and the leads 18. Such conductive material may be a silver frit in a suitable vehicle or binder, sprayed molten silver or the like. One familiar with the art can readily select a suitable conductive material.

Capacitor element 10 and a portion of said leads are hermetically sealed by coating 22 which comprises an impervious dielectric material such as glass. The composition of the glass coating is not critical so long as it is a dielectric, is impervious, and is compatible with the capacitor element and leads.

Coating 22 is applied by plasma jet means in the form of molten particles which are caused to impinge on the surface of element 10. Said particles remain in molten form until they flow together to form a thin continuous coating 22. Sufficient heat is transferred from the molten particles to fuse the conductive films 20 to said element and said leads for improved electrical continuity. The coefficient of expansion of the glass is such that the glass coating exerts a compressive force on the element and the leads. Since the conductive films 20 are too thin to mechanically secure the leads to the plates, the coating 22 is the sole maintainer of the relative position and relationship of the leads and the capacitor element.

Suitable plasma jet means and a method of introducing powdered encapsulating material into a plasma stream are described in U.S. Patent No. 3,174,025, issued to Robert M. Johnson, the specification of which patent is incorporated herein by reference.

It has been found that electrical capacitors fabricated in accordance with the method of this invention, as hereinabove outlined, have a smooth surface, are free from entrapped air beneath the coating, are readily reproducible, have a high selection rate, have an exceptionally high bond strength between the leads and the capacitor element resulting solely from the glass coating as hereinabove described, and have many other advantages. Furthermore, these capacitors are simply and inexpensively fabricated since the leads thereof do not have to be welded to the capacitor element prior to the encapsulation thereof.

Although the present invention has been described with respect to specific details of certain embodiments thereof, it is not intended that such details be limitations upon the scope of the invention except insofar as set forth in the following claims.

I claim:

1. An electrical capacitor comprising:

a capacitor element, a pair of leads disposed adjacent the ends of said element in a line parallel with the direction of the longitudinal axis thereof, a thin film of conductive material disposed at each junction of said element and said leads having a thickness sufficient to provide electrical continuity therebetween, said thin film providing substantially no mechanical bonding strength between said element and said leads, and a continuous adherent impervious coating of glass applied over said entire element and a portion of said leads, said leads being maintained adjacent said ends solely by said coating of glass, said coating simultaneously maintaining said leads in electrical contact with said element through said conductive material.

2. An electrical capacitor in accordance with claim 1 wherein said thin film of conductive material is a thin metallic film.

3. An electrical capacitor in accordance with claim 2 wherein said thin film of conductive material is silver.

4. An electrical capacitor comprising a capacitor element, a pair of leads disposed adjacent the ends of said element in a line parallel with the direction of the longitudinal axis thereof in such manner that said leads in part overlap a portion of the adjacent ends of said element, a thin metallic film disposed between each of said leads and the associated end of said element having a thickness sufficient to provide electrical continuity therebetween, said metallic film providing substantially no mechanical bonding strength between said element and said leads, and a continuous adherent impervious coating of glass applied over said entire element and a portion of said leads, said coating exerting a compressive force against said element and said portion of said leads so that said leads are maintained adjacent said ends solely by said coating of glass, said coating simultaneously maintaining said leads in electrical contact with said element through said thin metallic film.

References Cited

UNITED STATES PATENTS

| | | | |
|---|---|---|---|
| 2,972,180 | 2/1961 | Gulton et al. | 317—261 X |
| 3,012,214 | 12/1961 | Bronson et al. | 338—237 |
| 3,169,216 | 2/1965 | Layton et al. | 317—261 |

VOLODYMYR Y. MAYEWSKY, Primary Examiner

U.S. Cl. X.R.

264—272; 317—261; 338—262